May 9, 1967          H. ULANET          3,319,049

THERMOSTATICALLY CONTROLLED ELECTRIC IMMERSION HEATERS

Filed Sept. 10, 1964

INVENTOR.
HERMAN ULANET
BY
Nils H. Hutchinson
ATTORNEY

United States Patent Office 3,319,049
Patented May 9, 1967

3,319,049
THERMOSTATICALLY CONTROLLED ELECTRIC
IMMERSION HEATERS
Herman Ulanet, 473 Richmond Ave.,
Maplewood, N.J. 07040
Filed Sept. 10, 1964, Ser. No. 395,470
2 Claims. (Cl. 219—523)

This invention relates to a thermostatically controlled electric immersion heater.

It is an object of the instant invention to create an electric immersion heater that is in close thermal relation with a sensitive thermostat mechanically protected against damage.

A further object is to provide a three wire cord for the heater, one of the wires being grounded to a non-current carrying portion of the heater assembly to prevent electric shock to the user.

Another object is to prevent burn out of the heating element under low liquid level conditions.

In addition, it is an object of this invention to provide a thermostatically controlled heater assembly having a pipe threaded for permanent installation in a vessel, and also equipped with pilot light, cord set and enclosure.

It is also an object to create an electric immersion heater adapted to be submerged in an open top vessel such as a beaker.

An additional object is to provide a thermometer removably attached to the assembly to facilitate thermostat adjustment to a given temperature.

In the attainment of the aforesaid objectives, subject immersion heater is made in two embodiments. In the first embodiment, the heater is provided with an externally threaded header for permanent installation into a liquid container or vessel. In the second embodiment, the heater is designed for removable insertion through the open top of a liquid container.

The invention will appear more clearly from the following detailed description when taken in conjunction with the accompanying drawings showing by way of example the preferred embodiments of the inventive concept.

In the drawings:

FIGURES 1, 2, and 3 show the first embodiment of subject immersion heater in which:

FIGURE 3 is a top view of the header of the heater in which:

FIGURES 4 and 5 show the second embodiment of the heater in which:

FIGURE 4 is a side view of the heater with attached thermometer, the assembly being designed for removable insertion through the open top of a vessel; and FIGURE 5 is a top view of a spring member removably secured at one end to the thermometer and at the opposite end to the header of the heater.

Figure 1:
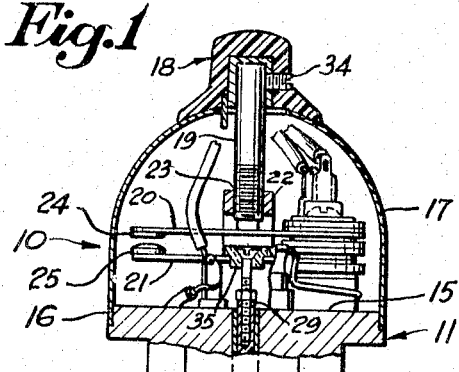
FIGURE 1 is a front view of the heater in part section.
Figure 2:
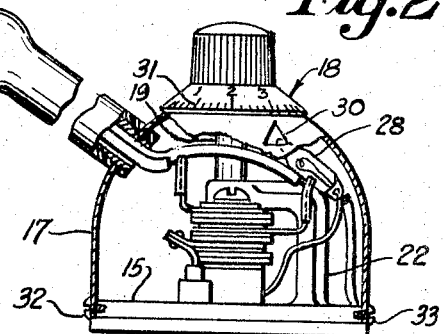
FIGURE 2 is a side view of the heater shown in FIGURE 1 with a portion of the cover broken away.
Figure 3:
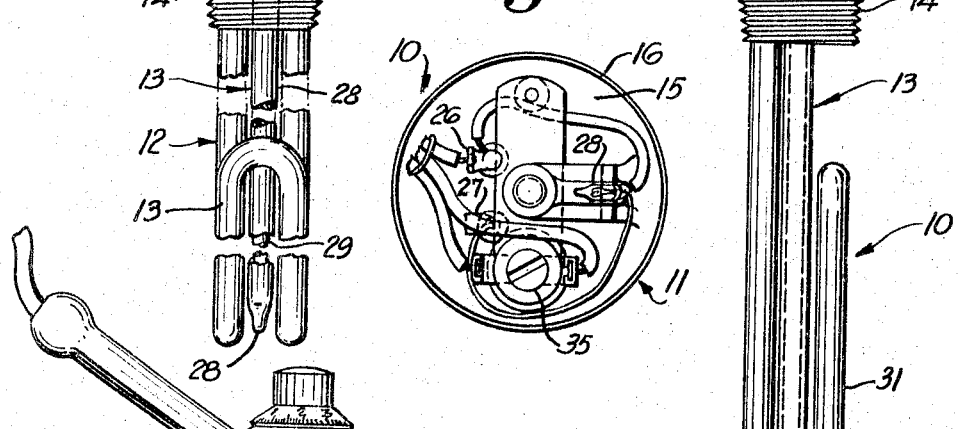

Referring now to the first embodiment of the thermostatically operated electric immersion heater shown in FIGURES 1, 2, and 3, reference numeral 10 indicates the heater and thermostat assembly.

The immersion heater and thermostat assembly 10 is constituted in part of a header 11, a differential expansion thermostatically actuating member 13, and a heating element 12.

The header 11 is externally threaded at the bottom 14 for removable insertion in an internally threaded inlet in a liquid container (not shown). At the top, the header 11 has a flat surface portion 15 the periphery of which at the top is recessed as at 16 for the removable insertion of a cover (FIGS. 1 and 2) and designated by numeral 17. The screws 32 and 33 (FIG. 2) through the base of the cover 17 and threaded into the flat surface portion 15 of the header removably secures the cover in position. An adjustment knob 18 over the top of the cover 17 is attached by setscrew 34 to an adjustment shaft 19 the inner end of which, equipped with an insulator, is in operable engagement with the upper spring contact member for varying the pressure of the later mentioned contact points 24 and 25.

A bracket 22 (FIG. 2), integrally formed with or otherwise secured to the flat surface portion 15, extends upwardly therefrom at approximately 90 degrees. Adjacent the top, the bracket 22 is bent inwardly beyond the center of the flat surface. Adjacent the free end of the inwardly bent portion is a threaded opening 23 (FIG. 1) substantially aligned with the shaft 19 and through which the shaft is threaded for operable engagement with the following mentioned upper spring contact member 20 to vary the pressure of the contact points.

At substantially 90 degrees, clockwise, from the bracket 22 are the fixed ends of a pair of spring contact members 20 and 21 which extend forwardly therefrom in spaced and insulated alignment intermediate the bent portion of the bracket and the flat surface portion of the header. At the free ends of the contact members are the contact points 24 and 25 in operable engagement when closed.

Opposite the upwardly directed portion of the bracket 22 are two heater terminals 26 and 27 (FIG. 3). One terminal 27 is connected in series with one terminal of the thermostatic switch. One live lead of a three wire cord inserted in the closure is connected to the other heater terminal 26 and the other live lead to the other thermostatic switch terminal thus completing the circuit when the contact points 24 and 25 are closed. The ground lead of the three wire cord is connected to the screw 35 which holds the switch assembly to the header whereby the ground lead of the three wire cord assures electrical ground continuity to the device which may be inserted into a metallic vessel containing a liquid so that the user is protected against electric shock.

The thermostatically controlled actuating member 13 which separates contacts points 24 and 25 at a preselected temperature is constituted in part by a thermal sensing tube 28 secured at its top to the bottom of header 11 by any known means. In tube 28 and coextensive therewith is a rod 29 having a low coefficient of expansion as compared with that of the tube 28. The rod 29 extends upwardly through an aligned aperture in header 11 and the upper end of the rod is aligned with a clearance opening in the lower spring contact member 21. The upper end of rod 29 is internally threaded. An insulator bushing 35 is loosely seated in the clearance opening in spring contact member 21. The bushing 35 has a shoulder portion overlying and in contact with the top of the lower spring contact member 21 and a reduced diameter shank portion loosely seated in the clearance opening in the lower spring contact member. A threaded screw having an enlarged head at its upper end and a threaded lower end passes downwardly through bushing 35 and has its threaded lower end engaged in the internally threaded end of rod 29. At the bottom, rod 29 is secured to tube 28 by crimping, as illustrated, or by any other suitable means. On rising temperature the tube 28 will expand and pull the rod 29 downwardly to separate the contact points 24 and 25 of contact members 20 and 21.

The heating element 12 is constituted in part of a tube 31 in which is inserted an electric resistance wire coil (not shown) which is packed therearound with an electrically insulated but thermal conducting powder. The electric resistance coil may be of any known type or of the special type shown in applicant's pending application Ser. No. 354,910, filed Mar. 26, 1964.

On the outer surface of the upwardly directed portion of the bracket 22 is a pilot light 28 (FIGS. 2 and 3) connected to the terminals 26 and 27. Through the cover 17 and substantially opposite the pilot light 28 is an opening 30 (FIG. 2) for light transmission from the pilot light. When the light is on, it indicates that the contact points 24 and 25 are closed and facilitates calibration of the thermostat for a required temperature with the aid of the circumferentially spaced indicia 31 (FIG. 2) around the base of the knob 18.

Figure 4:
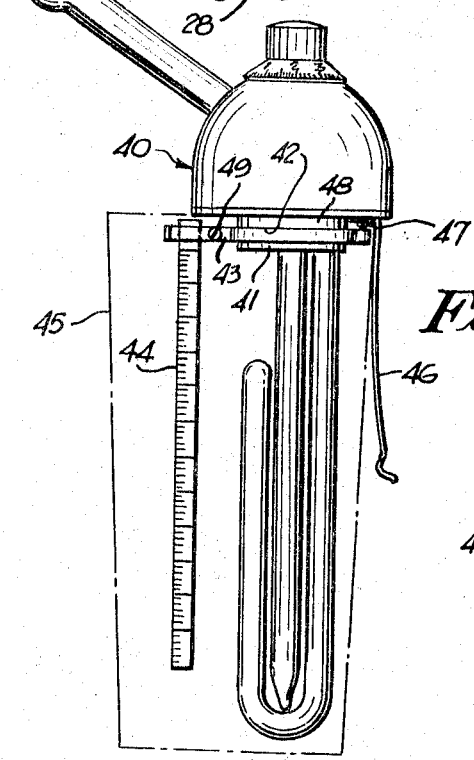
Figure 5:
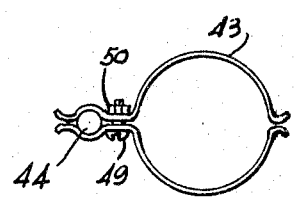

Referring now to the second embodiment of the thermostatically operated immersion heater shown in FIGURES 4 and 5, reference numeral 40 indicates the assembly.

The assembly 40 is substantially the same as the first embodiment with at least the following exceptions: First, the base of the header 48, rather than being externally threaded as in the first embodiment, is formed with a circumferential recess 42; second, removably inserted in the recess 42 is a spring member 43 which extends outwardly, to the left in FIGURE 4, to removably secure a thermometer 44; and, third, rather than being intended for insertion in an internally threaded connection leading into a liquid containing vessel, the assembly of the second embodiment is designed for insertion in an open top vessel 45. A spring bracket 46 is secured to the bottom of the header 48 by a rivet 47 or other suitable means which aids in holding the assembly in the open top of the vessel. The previously mentioned spring member 43 extends inwardly from the header 48, to the left as illustrated, to secure the thermometer 44 by means of the screw 49 and nut 50.

I claim:
1. A thermostatically controlled electric immersion heater having a header, the header having a base and an upward extension including a portion spaced from and parallel to the base, the header being adapted for removable insertion in a closed container, a switch subassembly disposed on the top of the header, a pair of spring contact members included in the switch subassembly, means fixing one end of the spring contact members in spaced and stacked pile arrangement by a common fastener and insulated from each other and the header, and the free ends of the contact members having normally closed spring contact points; a metal heater tube disposed on the base of the header and extending downwardly therefrom and within the diameter thereof, a resistance wire disposed in the tube and insulated therefrom by ceramic powder, the heater tube being bent in a double hairpin loop, one end of a high expansion thermal sensing tube disposed on the base of the header with the opposite end thereof extending downwardly therefrom between the loops of the heater tube and in close proximity thereto, the heater tube substantially surrounding the sensing tube on at least four sides, a rod of low coefficient of expansion relative to the coefficient of expansion of the sensing tube and coextensive with the length of the tube disposed in the tube, the lower end of the tube being fastened to the lower end of the rod, the lower ends of the tube and rod further being sealed against leakage, the upper end of the low expansion rod being slidably disposed through an aligned aperture in the header with the upper end extremity of the rod being internally threaded, the lower spring contact member being provided with a clearance opening aligned with the upper end extremity of the rod, an insulator bushing seated in the clearance opening, the insulator bushing including a shoulder portion overlying and in contact with the upper surface of the lower spring contact member and a reduced diameter shank portion seated loosely in said clearance opening, a threaded spring contact member tensioning screw passing through the insulator bushing and having a head at the upper end thereof seated in said bushing and having a lower threaded portion engaging the internally threaded end of the rod; an adjustment screw threadedly engaged at a right angle in the upward extension of the header and engaging the upper spring contact member, one terminal of the resistance wire connected in series with one terminal of the switch, and another terminal of the resistance wire and another terminal of the switch both connected to a power source through two wires of a three wire cord set passing through a handle attached to a cover fastened over the header, the third wire of the cord set being connected to a ground prong on the attachment plug of the cord set, and the other end of the third wire connected to a non-current carrying point of the assembly.

2. A thermostatically controlled electric immersion heater having a header, the header having a base and an upward extension including a portion spaced from and parallel to the base, a switch subassembly disposed on the top of the header, a pair of spring contact members included in the subassembly, means fixing one end of the spring contact members in spaced and stacked pile arrangement by a common fastener and insulated from each other and the header, and the free ends of the spring contact members having normally closed spring contact points, a heater tube disposed on the base of the header and extending downwardly therefrom and within the diameter thereof, and a resistance wire disposed in the tube and insulated therefrom by ceramic powder, the heater tube being bent in a double hair pin loop, one end of a high expansion thermal sensing tube extending downwardly therefrom between the loops of the heater tube, the heater tube substantially surrounding the sensing tube on at least four sides, a rod of low coefficient of expansion relative to the coefficient of expansion of the sensing tube and coextensive with the length of the tube slidably disposed in the tube, the lower ends of the tube and rod being secured together, the lower ends of the tube and rod being sealed against leakage, the upper end of the low expansion rod being slidable through an aligned aperture in the header with the upper end extremity of the rod being internally threaded, the lower spring contact member being provided with a clearance opening aligned with the upper extremity of the rod, an insulator bushing including a shoulder portion overlying and in contact with the upper surface of the lower spring contact member and a reduced diameter shank portion sealed loosely in said clearance aperture, a threaded spring contact member tensioning screw passing through the insulator bushing and having a head at the upper end thereof seated in said bushing and further having a lower threaded portion engaging the internally threaded portion of the rod; an adjustment screw engaged at a right angle to the upward extension of the header and the upper spring contact member and in operable engagement with the upper spring contact member; one terminal of the resistance wire connected in series with one terminal of the switch, another terminal of the resistance wire and another terminal of the switch both connected to a power source through two wires of the three wire cord set passing through a handle attached to a cover fastened over the header, and the third wire of the cord set being connected to a ground prong on the attachment plug of the cord set, and the opposite end of the third wire being connected to a non-current carrying point of the assembly; a bracket for removably securing the header over the rim of an open top container, a portion of the bracket being secured to the base of the header and extending outwardly therefrom, another portion of the bracket at the outwardly extended end thereof being turned downwardly and substantially in spaced parallel arrangement with the sensing tube, and a thermometer holder on the base of the header, the holder comprising two segments of substantially equal length, each segment being tightly fitted around opposite sides of the base of the header and, substantially opposite the bracket, extending outwardly to form a holder for the thermometer, and means intermediate the holder and the base of the header holding the segments and thermometer in place.

References Cited by the Examiner

UNITED STATES PATENTS

| | | | |
|---|---|---|---|
| 2,037,993 | 4/1936 | Miller et al. | 219—335 X |
| 2,039,641 | 5/1936 | Fichtner | 219—512 X |
| 2,606,271 | 8/1952 | Morris | 219—536 X |
| 2,769,878 | 11/1956 | Krichton | 200—137.2 |
| 3,025,374 | 3/1962 | Reingruber | 200—137.2 |

FOREIGN PATENTS

| | | |
|---|---|---|
| 671,058 | 4/1952 | Great Britain. |
| 730,216 | 5/1955 | Great Britain. |

ANTHONY BARTIS, *Primary Examiner.*